(12) United States Patent
McCullough

(10) Patent No.: US 8,782,143 B2
(45) Date of Patent: Jul. 15, 2014

(54) DISK MANAGEMENT

(75) Inventor: Wesley McCullough, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 470 days.

(21) Appl. No.: 12/336,706

(22) Filed: Dec. 17, 2008

(65) Prior Publication Data

US 2013/0166689 A1    Jun. 27, 2013

(51) Int. Cl.
*G06F 15/16* (2006.01)
*G06F 13/00* (2006.01)
*G06F 13/28* (2006.01)

(52) U.S. Cl.
USPC ............ 709/206; 711/118; 711/135; 711/136

(58) Field of Classification Search
USPC ............. 709/214, 229; 725/92, 115; 711/133, 711/136, 160
See application file for complete search history.

(56) References Cited

U.S. PATENT DOCUMENTS

| | | | | |
|---|---|---|---|---|
| 4,322,795 A * | 3/1982 | Lange et al. | | 711/136 |
| 5,043,885 A * | 8/1991 | Robinson | | 711/133 |
| 5,606,688 A * | 2/1997 | McNutt et al. | | 711/170 |
| 6,128,712 A * | 10/2000 | Hunt et al. | | 711/158 |
| 6,272,593 B1 * | 8/2001 | Dujari | | 711/118 |
| 6,671,766 B1 * | 12/2003 | Vandenbergh et al. | | 711/160 |
| 6,678,793 B1 * | 1/2004 | Doyle | | 711/133 |
| 7,174,440 B2 * | 2/2007 | Chang et al. | | 711/202 |
| 7,246,369 B1 * | 7/2007 | Duan et al. | | 725/115 |
| 7,324,555 B1 * | 1/2008 | Chen et al. | | 370/468 |
| 7,552,223 B1 * | 6/2009 | Ackaouy et al. | | 709/229 |
| 7,617,362 B2 * | 11/2009 | Craft et al. | | 711/133 |
| 7,752,386 B1 * | 7/2010 | Aral et al. | | 711/113 |
| 2002/0065899 A1 * | 5/2002 | Smith et al. | | 709/214 |
| 2002/0069420 A1 * | 6/2002 | Russell et al. | | 725/92 |
| 2002/0078300 A1 * | 6/2002 | Dharap | | 711/133 |
| 2002/0120818 A1 * | 8/2002 | Hofmann et al. | | 711/133 |
| 2002/0152361 A1 * | 10/2002 | Dean et al. | | 711/160 |
| 2005/0060496 A1 * | 3/2005 | Krissell et al. | | 711/133 |
| 2005/0172080 A1 * | 8/2005 | Miyauchi | | 711/136 |
| 2006/0230170 A1 * | 10/2006 | Chintala et al. | | 709/231 |
| 2007/0233958 A1 * | 10/2007 | Wang | | 711/118 |
| 2009/0276572 A1 * | 11/2009 | Heil et al. | | 711/118 |
| 2010/0070714 A1 * | 3/2010 | Hoover et al. | | 711/128 |
| 2010/0128918 A1 * | 5/2010 | MacWan | | 382/100 |
| 2010/0153802 A1 * | 6/2010 | Van der Merwe et al. | | 714/748 |

* cited by examiner

*Primary Examiner* — Tae Kim
(74) *Attorney, Agent, or Firm* — Wolfe-SBMC

(57) ABSTRACT

Systems, methods, and computer-program products store file segments by receiving a first file segment, and storing the first file segment in a first memory area having a highest ranking. The first memory area is reassigned as a memory area having a next highest ranking when a second file segment is received and the first memory area has reached a maximum capacity. The second file segment is stored in another memory that is reassigned as the memory area having the highest ranking.

18 Claims, 5 Drawing Sheets

DISK MANAGEMENT

FIELD

The present disclosure relates to memory management systems, methods, and computer program products.

BACKGROUND

Memory management is an essential task of computing devices to enable efficient storage and deletion of content while also permitting fast retrieval of content. Caching schemes are typically used enable optimization of the storage and retrieval of content. For instance, a least recently used (LRU) caching scheme discards least recently used content items first. However, if a disk in which content is stored is large, such that many files may be stored, there is often not enough memory to permit a computing device to maintain a list of files on the disk including necessary LRU information such as "age bits".

SUMMARY

This specification describes technologies relating to memory management. In general, one aspect of the subject matter described in this specification can be embodied in a computer-implemented method including receiving a first file segment and storing the first file segment in a first memory area. The method includes reassigning the first memory area as a second memory area when a second file segment is received, and the first memory area has reached a maximum capacity. The method further includes assigning another memory area as a new first memory area when the first memory area is reassigned as the second memory area, moving the second file segment in the new first memory area, and retrieving at least one of the first or second file segments.

Another aspect of the subject matter described in this specification can be embodied in a computer-implemented method including receiving a first file segment, and storing the first file segment in a first memory area. The method can include reassigning the first memory area as a second memory area when a second file segment, stored in another memory area, is accessed, and the first memory area has reached a maximum capacity. The method also includes assigning another memory area as a new first memory area when the first memory area is reassigned as the second memory area, moving the second file segment in the new first memory area, and retrieving at least one of the first or second file segments.

Yet another aspect of the subject matter described in this specification can be embodied in a system including a server, operable to capture content comprising a plurality of file segments, and at least one edge server, in communication with the server, comprising a plurality of memory areas, each of the plurality of memory areas having a respective rank. In the system the file segments received at the at least one edge server from the server are stored in a memory area, of the plurality of memory areas, having the highest rank, and the rank of each of the memory areas are changed after the memory area having the highest rank is unable to store additional content.

According to a feature, the memory areas can comprise subfolders on a disk. According to another feature, the file segments include at least a portion of a video file, such as portions of a recorded video or portions of a live video stream. Other embodiments of the above aspects include corresponding systems, apparatus, and computer program products.

Particular implementations of the subject matter described in this specification can realize one or more of the following advantages. Most recently stored or accessed content (e.g., files) are stored in a memory area for fast retrieval. Less recently stored or accessed content is stored in other memory areas, and memory areas storing the least recently used content can be deleted in their entirety, rather than, e.g., on a file by file basis as with many caching schemes. The use of multiple memory areas reduces the memory required to maintain a list of recently used content in comparison, for instance, to schemes where all content is stored in a single memory area.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
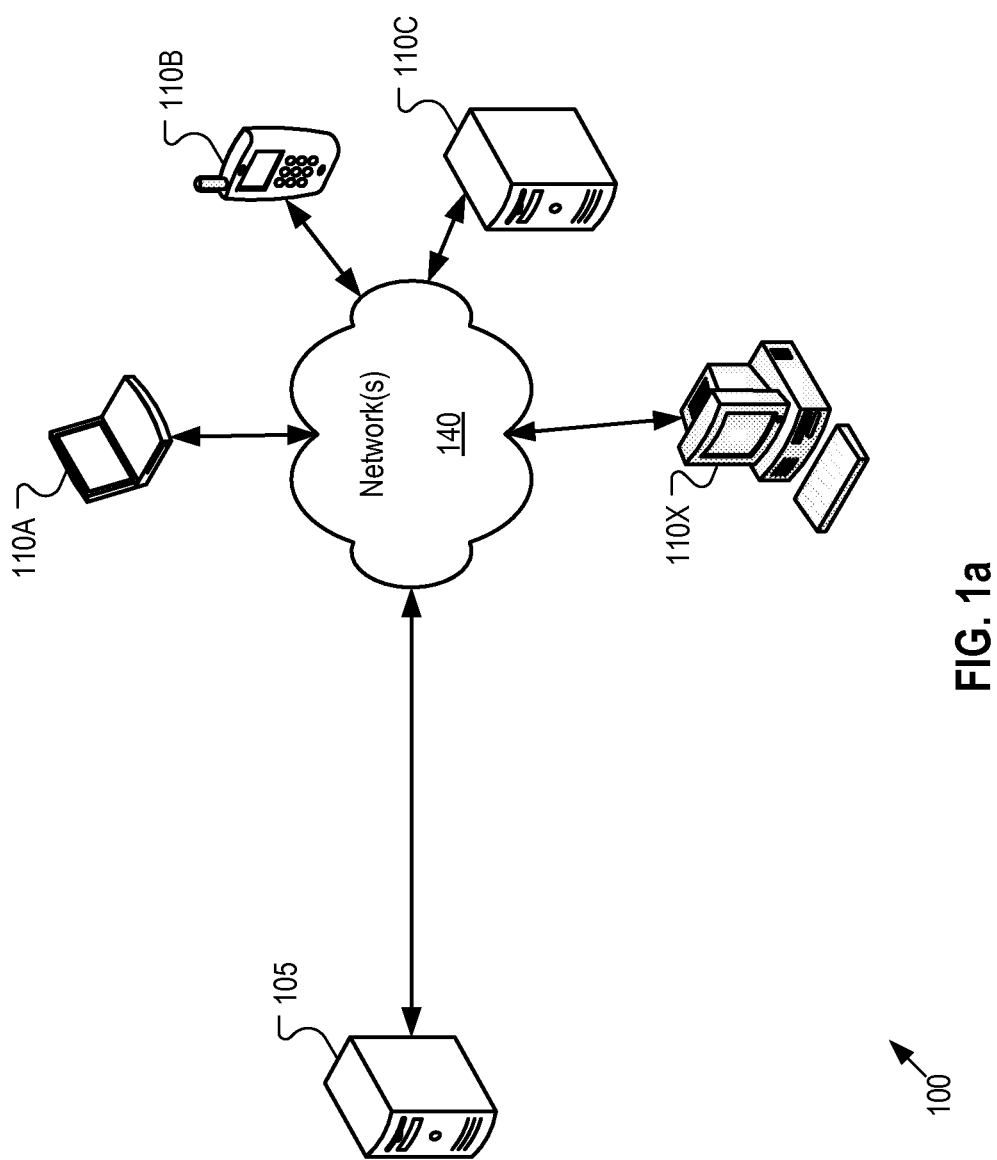
FIG. 1a shows an example system for receiving, storing, and/or redistributing content.

FIG. 1a shows an example system 100 for receiving, storing, and/or redistributing content. The system 100 generally includes at least one server 105 and at least one computing platform 110 in communication with the server 105 for receiving, storing, distributing, displaying, and/or redistributing content. According to some implementations, the server 105 and/or computing platforms 110 can engage in direct peer-to-peer communications. The computing platforms 110 can include a server 110C, desktop computer 110X, mobile device 110B (e.g., a phone), laptop computer 110A, or the like, which are operable to make the content available to users. For instance, the content can include multimedia content (e.g., audio, video, images, text, etc.) for display to users associated with one or more of the computing platforms 110.

The system 100 shown in FIG. 1a includes one or more networks 140 to permit communication between the server 105 and the computing platforms 110. The network(s) 140 can include one or more public networks (e.g., the Internet or the public switched telephone network), one or more private networks (e.g., an enterprise network or a virtual private network), or a combination of both. The server 105 can be a single server computer or multiple server computers (e.g., a server cluster, a server farm, or distant server computers linked through a network).

Figure 1B:
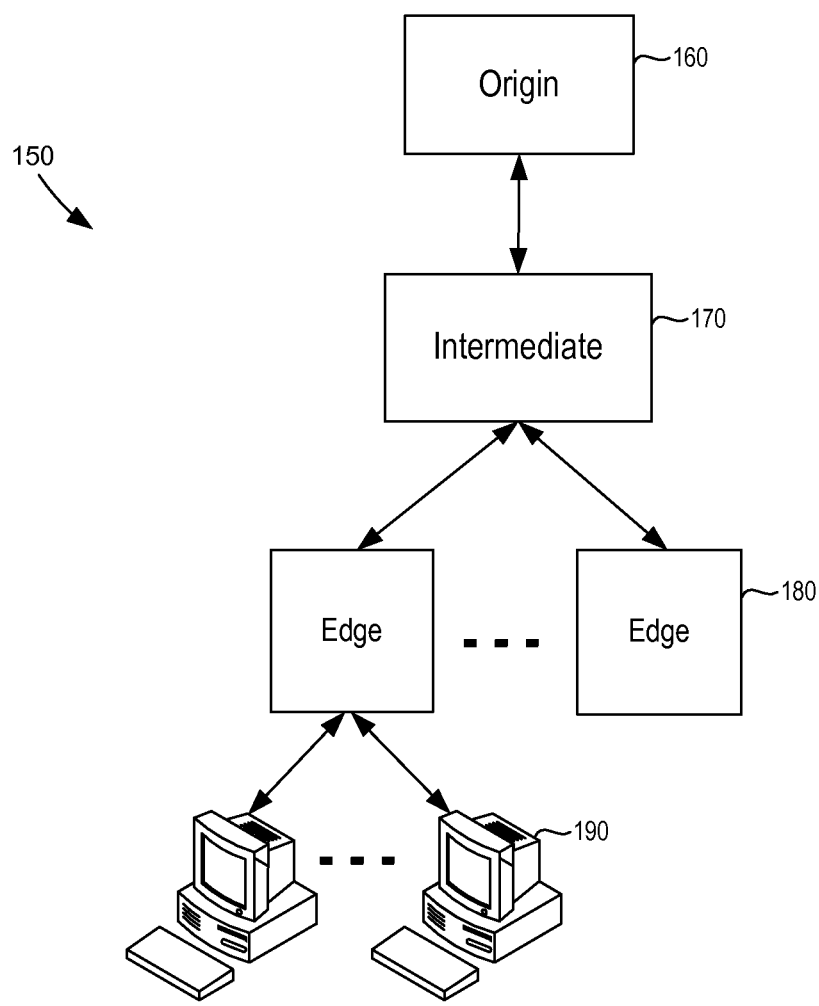
FIG. 1b shows another example system for receiving, storing, and/or redistributing content.

FIG. 1b shows an example multi-tier server architecture 150 for receiving, storing, and/or redistributing content. The multi-tier server architecture 150 includes multiple network nodes. The multi-tier server architecture 150 can be implemented to include three levels of servers 160-180 and client computers 190. The multi-tier server architecture 150 can be implemented to transmit content, e.g., a datastream, to the client computers 190. The content can be a live datastream broadcast, a near-live feed, and/or a recorded datastream. The live datastream broadcast can include a plurality of segments. Each of the plurality of segments can include a plurality of video frames and/or audio samples.

The plurality of segments can be transmitted as a near-live feed to servers 170, 180 and the client computers 190. In addition, the multi-tier server architecture 150 can be implemented to transmit a recorded datastream to the client computers 190. The recorded datastream can be formed by storing the plurality of segments. Three types of servers can reside in the multi-tier server architecture 150: an origin server 160; one or more intermediate servers 170; and one or more edge servers 180. According to some implementations, the edge servers 180 may also be referred to herein as edge-origin servers.

According to some implementations, the origin server 160 can represent the server 105 in FIG. 1a, and the other servers 170, 180, and/or client computers 190 can represent the computing platforms 110. According to other implementations, the origin server 160, intermediate server 170, and/or edge servers 180 can represent the server 105 in FIG. 1a, and the client computers 190 can represent the computing platforms 110.

In some implementations, the multi-tier server architecture 150 can be implemented in a static tree server structure. In a static tree server structure, downstream servers can transmit requests for content to directly connected upstream servers; downstream servers do not use efficiency algorithms to search for the 'best' upstream server. Servers more proximal to the origin server 160 are upstream servers. Servers that are more distal from the origin server 160 are downstream servers.

The origin server 160 resides at the top level of the multi-tier server architecture 150. The origin server 160 can act as an ingest server and can receive live video, audio and video/audio combinations for broadcast. The origin server 160 can obtain a live datastream including a plurality of segments. In some implementations, the origin server 160 can obtain the datastream by receiving the live data and segmenting the live data into the plurality of segments. In other implementations, the live data can already be segmented when the datastream is obtained by the origin server 160.

The origin server 160 can transmit the segmented live datastream as a near-live feed to intermediate server 170 directly. The origin server 160 also can transmit the segmented live datastream as a near-live feed to the one or more edge servers 180 and client computers 190 directly and/or indirectly through communication network connections in the multi-tier server architecture 150. The live datastream, pre- and/or post-segmentation, can be recorded by a recording device operatively coupled to the origin server 160 and transferred to the origin server 160 via a communication port, i.e., USB, Bluetooth, Ethernet, wireless Ethernet. The live datastream can be stored at the origin server 160.

The origin server 160 can also or alternatively transmit a recorded datastream to the intermediate server 170. The recorded datastream can include a plurality of stored segments, where each of the plurality of segments can include a plurality of video frames and/or audio samples, e.g., recorded from a live datastream.

The intermediate server 170 can reside at the second level of the multi-tier server architecture 150. The intermediate server 170 is connected to the origin server 160 through a communication network connection. The intermediate server 170 can obtain content from the origin server 160. The obtained content can include the live datastream, the near-live feed and/or the recorded datastream.

The intermediate server 170 can store at least a portion of the near-live feed and the recorded datastream locally. In some implementations, the intermediate server 170 can store the content in a memory cache of the intermediate server 170. As additional content is added to and stored in the intermediate server 170 memory cache, older content segments can be displaced when the capacity of the memory cache reaches a configurable storage limit. Older content segments can, in some implementations, be stored in a disk cache so they are not discarded. The intermediate server 170 can transmit the obtained content directly to one or more of the edge servers 180 and indirectly to the client computers 190 through the multi-tier server architecture 150. The intermediate server 170 can be implemented to transmit a request for content to the origin server 160.

The one or more edge servers 180 can reside at the third level of the multi-tier server architecture 150. The edge servers 180 are connected to the intermediate server 170 through a communication network connection. The edge servers 180 can obtain content from the intermediate server 170. The obtained content can include the live datastream, the near-live feed and/or the recorded datastream. The edge servers 180 can store at least a portion of the near-live feed and the recorded datastream locally. In some implementations, the edge server 180 can store the content in a memory cache of the edge server 180. As additional content is added to and stored in the edge server 180 memory cache, older content segments will be displaced when the capacity of the memory cache reaches a configurable storage limit.

The edge servers 180 can transmit the obtained content directly to client computers 190. The edge servers 180 can be implemented to transmit a request for content to the intermediate server 170. In some implementations, the edge servers 180 can have the same functionalities as the intermediate server 170, and thus can be interchangeable with the intermediate server 170.

The client computers 190 are connected to the edge servers 180 through a communication network connection. The client computers 190 can obtain content from the edge servers 180. The obtained content can include the live datastream, the near-live feed and/or the recorded datastream. The client computers 190 can store at least a portion of the obtained content locally, e.g. in a buffer. The client computers 190 can be operated by users that can request the recorded datastream, the live datastream, and/or the near-live feed from the edge servers 180.

Figure 2:
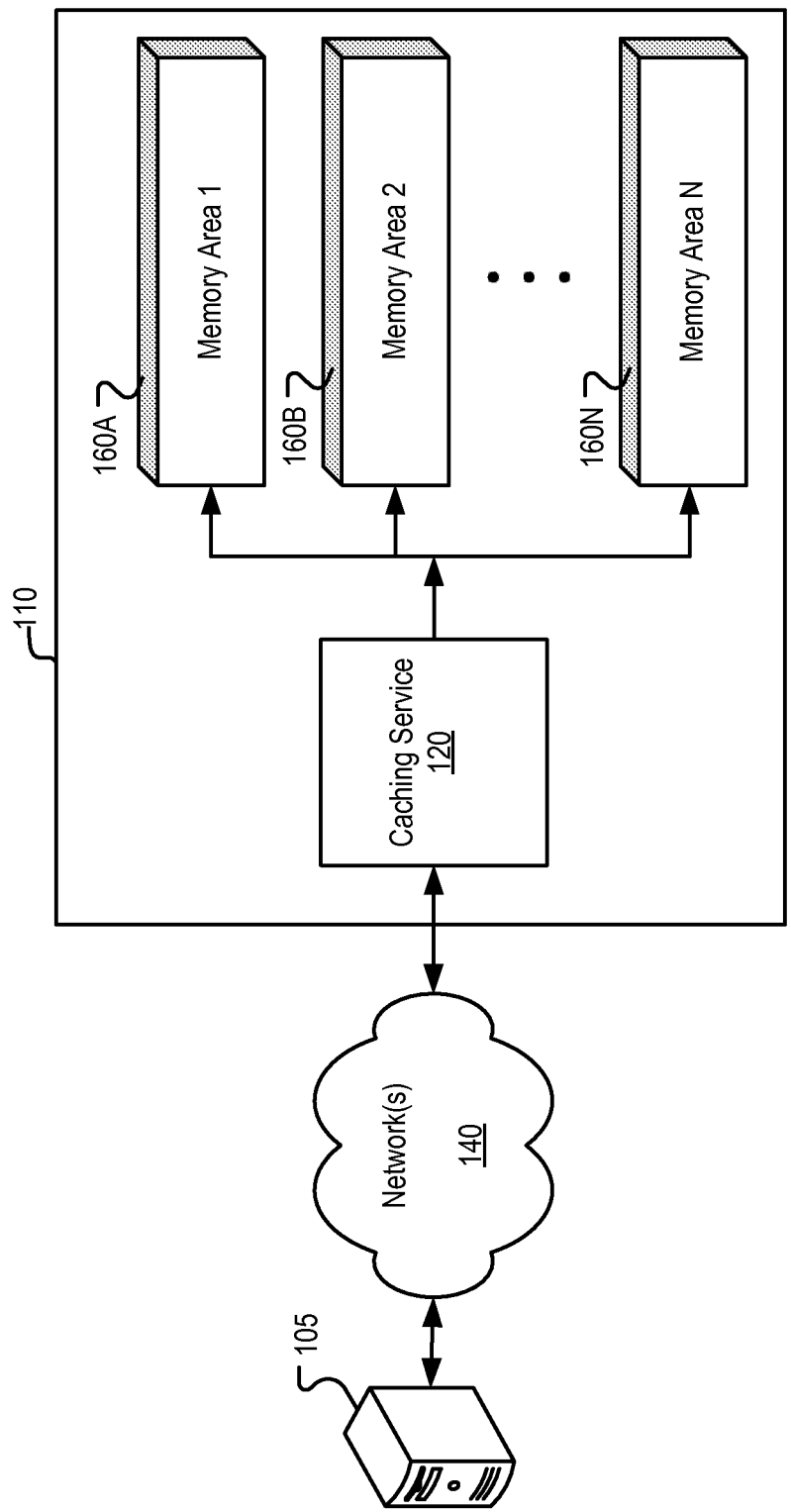
FIG. 2 shows a detailed view of a computing device.

FIG. 2 shows a detailed view of a computing device 110 in the example system 100 shown in FIG. 1a (or an intermediate server 170, edge server 180, and/or client computer 190 in the example system 150 shown in FIG. 1b). The computing device 110 generally includes a caching service 120 and two or more memory areas 160. The memory areas 160 store content that have been received at the computing device 110 from the server 105, for instance, over one or more networks 140. In some implementations each memory area 160 is a memory cache. Each memory area can represent a sub-directory in a memory, such as on a disk. The content may be transmitted, for instance, from a memory cache within the server 105 and transmitted to the computing device 110 using a push or pull process as is known in the art.

The respective memory areas 160A, 160B, 160N can each be associated with a respective memory area rank. The rank of each can be stored, for instance, by the caching service 120. As an example, in FIG. 2 the first memory area 160A may have the highest rank, the second memory area 160B may have the next highest rank, and so forth, with the last memory area 160N having the lowest rank.

Content most recently received or accessed by the computing device 110 is always stored in the memory area having the highest rank. In some implementations the content may be accessed from a lower ranked memory area (e.g., 160B-160N in FIG. 2) and then moved to the first memory area 160A. For example, upon the receipt of a content item, such as a file segment, at the computing device 110, the caching service 120 will store the content item in the first memory area 160A because it has the highest rank. The caching service 120 is also operable to identify when a read request is received for any content stored in the memory areas 160, which will result in the content item being moved to the first memory area 160A because it has the highest rank.

According to some implementations, the rank of each of the memory areas can be reassigned. For instance, a memory area having the lowest rank can be re-ranked as the memory area having the highest rank. This re-ranking process occurs when the highest ranking memory area has no more memory to store recently received or accessed content. When that occurs, the contents of the memory area having the lowest rank are purged (i.e., deleted), and the empty memory area is re-ranked as having the highest rank, which permits storage of the recently received or accessed content. The previously highest ranked memory is re-ranked as having the second highest rank, and the remaining memories are all re-ranked, respectively, one ranking position lower. The re-ranking of memory areas can be effected, for instance, by the caching service 120.

Figure 3A:
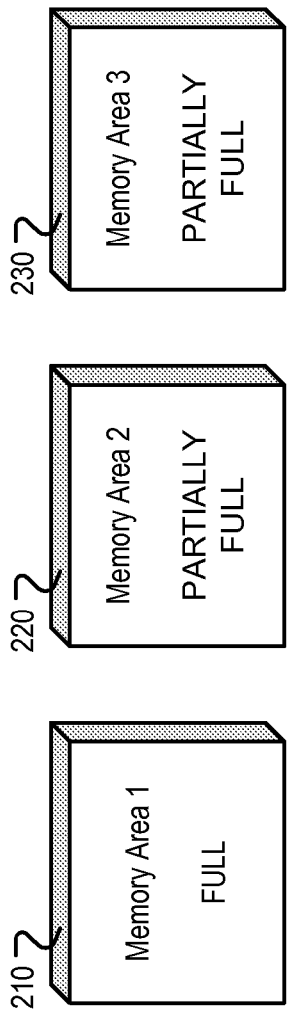
FIGS. 3A-3C show an example process for re-assigning memory area rankings.
Figure 3B:
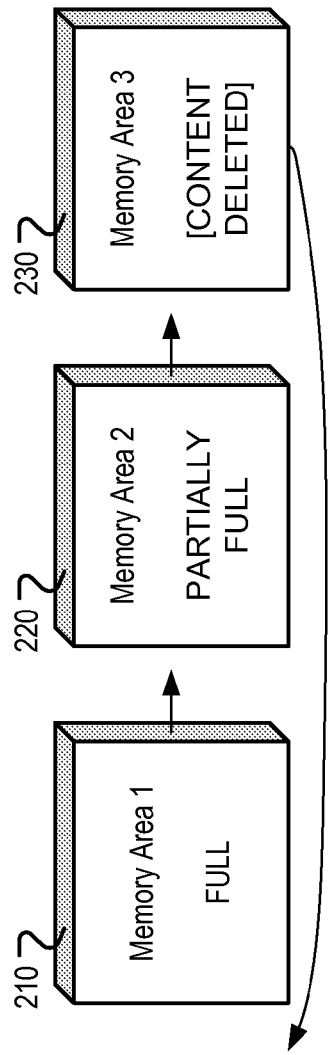
Figure 3C:
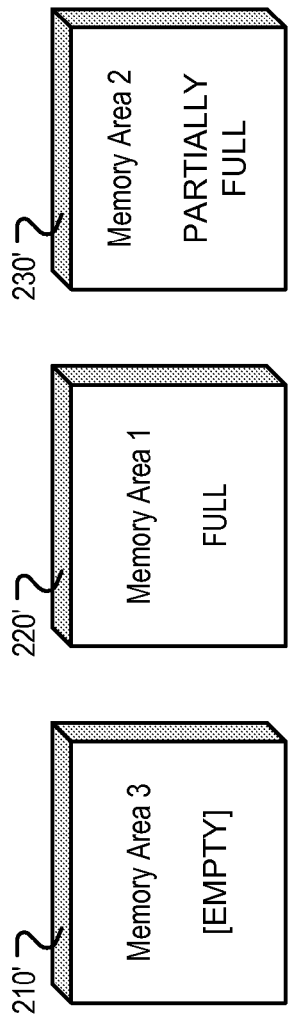

An example process for re-assigning memory area rankings is shown in FIGS. 3A-3C. FIG. 3A shows three memory areas in a computing device, with a memory area 1 having a highest rank 210, a memory area 2 having a next highest rank 220, and a memory area 3 having a lowest rank 230. In the example shown in FIGS. 3A-3C, memory area 1 in FIG. 3A is full, such that it cannot store content recently received at the computing device or recently accessed. As shown in FIG. 3B, in order to store the content in the highest ranking memory area, content in the memory area 3, which is associated with the lowest rank 230, is purged. As shown in both FIGS. 3B and 3C, subsequent to deletion of the content in memory area 3, that memory area is re-assigned as having the highest rank 210'. Memory area 1, which previously had the highest rank 210 is reassigned as having the second highest rank 220', and memory area 2 is reassigned as having the lowest rank 230. Once memory area 3 is full of newly received or accessed content, the process will repeat itself, with the contents of memory area 2 being deleted and that memory area being reassigned as having the highest rank.

Referring again to FIG. 2, prior to storing a newly received content item in the first memory area 160A, the caching service 120 can identify if the first memory area 160A has capacity to receive the content. If not, the caching service 120 can delete the entire contents of the lowest ranked memory area and can reassign the rankings of each memory area. Otherwise newly received or accessed content will be stored in the first memory area 160A.

Because the content within lowest ranked memory area is deleted when the highest ranked memory area is full, it will be appreciated that the above-described process results in a deletion of up to 1/N of the stored content, where each memory area has the same total capacity and N is the total number memory areas are used.

The caching service 120 shown in FIG. 2 controls the reading and writing of content into the respective memory areas, as well as maintaining the ranking of each memory area (e.g., in a table) and the list of files in the highest ranked memory area and their respective age. Additionally, upon receiving a request for content, the caching service 120 can retrieve the content from one of the memory areas. However, it will be appreciated that one of more of those functions may be executed by one or more other computing device 110 or system 150 components that are not illustrated, such as tables, databases, CPUs, and the like. Additionally, according to some implementations, the number of memory areas is configurable by a user or administrator using an interface, for instance, with the caching service 120.

It will be appreciated the caching service 120 need not know which content (e.g., file segments) are in which memory areas (e.g., subfolders on a disk), in contrast, for instance, to an LRU scheme. Instead, in some implementations the caching service 120 is operable to notify the computing device 110 (or another client computing device of the caching service 120) the memory area content, such as a file segment, resides in after it is moved into the memory area having the highest rank. The computing device 110 can store an ID of this memory area and transmit it to the caching service 120 when the device 110 needs to retrieve the content later. If no ID is passed to the device 110, or the segment is not located in its last known memory area location (e.g., because that memory area has been purged), the caching service 120 can report a error message, such as a "cache miss" message, or can automatically scan all of the memory areas for the desired content.

Additionally, according to some implementations, content may not be automatically moved to the memory area having the highest rank when accessed. Instead, the caching service 120 can be configured, for instance, by a user, to have a rank threshold. When a segment in a memory area is accessed it will be moved to the memory area having the highest rank only if the rank of the memory area the content currently resides in is below the threshold. For instance, if the rank threshold is set to '3', then accessed content residing in a memory area having a rank of 4 will be moved to the top ranked memory area, while accessed content residing in a memory area having a rank of 2 will not be moved. This avoids additional moves, improving performance.

Figure 4:
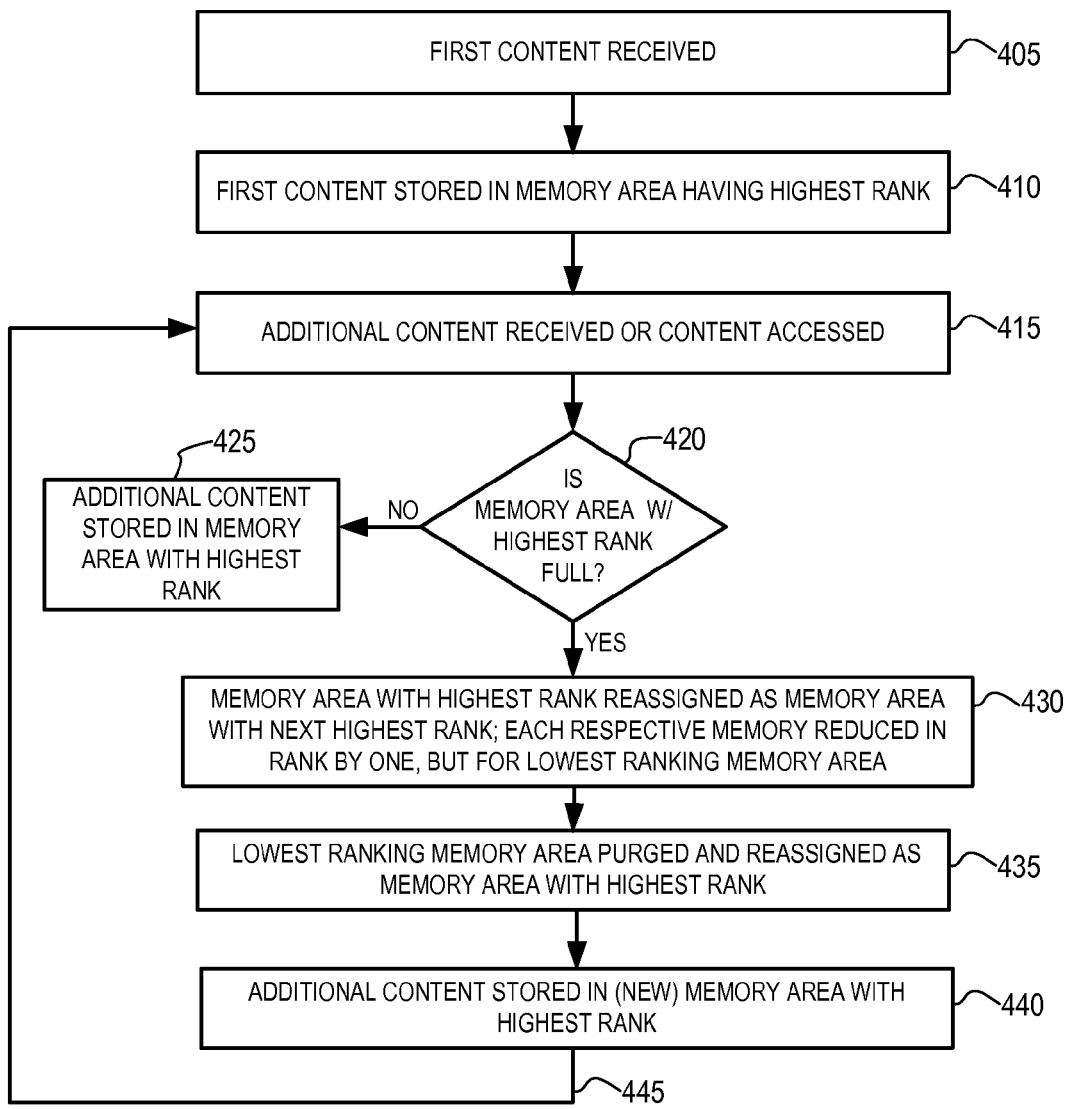
FIG. 4 shows an example process for storing content in memory areas.

FIG. 4 shows an example high level process 400 for memory management. First content, e.g., a first file segment, is received (405), for instance, at a computing device 110. The content can include multimedia, such as a portion of a video file, audio associated therewith, and the like. The first content is stored (410) in the computing device 110, for instance, in a first memory area 106A, which has the highest memory area rank of two or more memory areas.

When additional content, e.g., a second file segment, is received at the computing device 110 or content is accessed from a memory area in the computing device (415), the capacity of the memory area having the highest ranking is examined (420) to determine whether the memory area is full, (i.e., has already reached a maximum capacity) and is thus unable to store the additional content. The determination can be made by the caching service 120, which can examine both the available capacity of the highest ranked memory area and the size of the content to be added.

If the memory area is full (420), the memory area having the highest rank is reassigned as a memory area having the next highest rank (i.e., a lower area rank than the highest area rank) (430). Other memory areas, other than the memory area having the lowest rank, are reassigned as having a rank that is reduced by one (430). A memory area storing the oldest content (and thus having the lowest rank) is purged and reassigned as the highest ranking memory area (435). The additional content is then stored in that memory (440), for instance, by the caching service 120. The process then repeats itself when new content is received or accessed (445).

Embodiments of the subject matter and the functional operations described in this specification can be implemented in digital electronic circuitry, or in computer application, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single application product or packaged into multiple application products.

Thus, particular embodiments of the invention have been described. Other embodiments are within the scope of the following claims. For example, the actions recited in the claims can be performed in a different order and still achieve desirable results.

The invention claimed is:

1. A computer implemented method, comprising:
assigning first, second and third memory areas associated with a computer respective ranks, the first memory area having a highest rank and the third memory area having a lowest rank, each of the first, second and third memory areas being sized to store two or more file segments;
receiving, at the computer, a first file segment;
storing the first file segment in the first memory area associated with the computer;
reassigning a lower rank of the second memory area to the first memory area in response to:
receiving a second file segment, and
determining that the first memory area is unable to store the second file segment due to being partially full such that an available capacity of the first memory is less than a size of the second file segment;
assigning to the third memory area the highest rank previously had by the first memory area in the computer in response to said reassigning the lower rank of the second memory area to the first memory area to make the third memory area available to store the second file segment and the second memory area that is partially full unavailable to store additional file segments;
purging the third memory area in its entirety such that two or more file segments previously stored in the third memory area are deleted; and
storing the second file segment to the third memory area currently having the highest rank in the computer.

2. The method of claim 1, wherein the first file segment and the second file segment comprise at least a portion of a live stream of video or recorded video.

3. The method of claim 1, wherein each of the first memory area, second memory area, and third memory area are respective subfolders on a disk.

4. A system, comprising:
a server to capture content comprising a plurality of file segments; and
at least one edge server, in communication with the server, comprising a plurality of memory areas, each of the plurality of memory areas having a respective rank and being sized to store content including two or more of the plurality of the file segments, wherein the edge server is configured to:
receive a first file segment from the server and store the first file segment in a memory area, of the plurality of memory areas, having a highest rank;
receive a second file segment from the server and in response to a determination that the memory area having the highest rank is unable to store the second file segment due to being partially full such than an available capacity of the memory area having the highest rank is less than a size of the second file segment, purge an entirety of the contents of a memory area, of the plurality of memory areas, having a lowest rank;
change the rank of each of the memory areas after the memory area having the highest rank is unable to store the second file segment, the purged memory area is reassigned from the lowest rank to the highest rank to make the purged memory area available to store the second file segment and the memory area previously having the highest rank made no longer available to store additional file segments; and
store the second file segment in the purged memory area.

5. The system of claim 4, wherein the content including the plurality of the file segments comprises a live stream of video or recorded video.

6. The system of claim 4, wherein the at least one edge server is further to receive a request for video from one or more client devices in communication with the at least one edge server.

7. The system of claim 4, further comprising one or more client devices, wherein the one or more client devices request video from the at least one edge server for display on the one or more client devices.

8. The system of claim 4, wherein the system comprises a digital recording system.

9. A system comprising:
a server; and
a storage system to receive a plurality of file segments from the server, each of the file segments comprises a plurality of video frames, a plurality of audio samples, or a combination of video frames and audio samples, wherein the storage system comprises:
a plurality of memory areas, each of the plurality of memory areas are associated with a respective memory area rank and are sized to store two or more of the plurality of the file segments, the plurality of memory areas include a memory area having a highest rank and a memory area with a lowest rank, file segments most recently received at or accessed from the storage system are stored in the memory area with the highest rank;
a processor to:
receive a file segment of the plurality of files segments from the server;
determine that the memory area with the highest rank is unable to store the second file segment due to being partially full such that an available capacity of the memory area with the highest rank is less than a size of the second file segment;
reassign the respective memory area ranks such that the memory area with the lowest rank is purged in its entirety and reassigned as the memory area with the highest rank and the memory area that previously had the highest rank and is partially full is no longer available to store additional file segments; and
store the received file segment in the purged memory area.

10. The system of claim 9, wherein each of the memory areas comprises respective subfolders on a disk.

11. The system of claim 9, wherein the plurality of file segments comprise video files.

12. The system of claim 9, wherein file segments least recently received at the storage system are stored in the memory area with the lowest rank.

13. A computer program product, tangibly encoded on a computer-readable medium, the program comprising instructions that responsive to execution by data processing apparatus cause the data processing apparatus to perform operations comprising:
receiving a first file segment;
storing the first file segment in a memory area being sized to store two or more file segments, the memory area having a highest rank;
reassigning a next highest rank to the memory area having the highest rank in response to:

receiving a second file segment comprising a plurality of video frames, a plurality of audio samples, or a combination of video frames and audio samples, and determining that the memory area having the highest rank is unable to store the second file segment due to being partially full such that an available capacity of the memory area is less than a size of the second file segment;

assigning the highest rank previously had by the memory area to a second memory area being sized to store two or more file segments in response to said reassigning the next highest rank to the memory area to make the second memory area available to store the second file segment and the memory area that previously had the highest rank and that is partially full as unavailable to store additional file segments;

purging the second memory area in its entirety such that two or more file segments previously stored in the second memory area are deleted; and storing the second file segment to the second memory area currently having the highest rank.

14. The computer program product of claim 13, wherein the first file segment comprises a video file.

15. The computer program product of claim 13, wherein each of the memory areas are respective subfolders on a disk.

16. A computer implemented method, comprising:

assigning first, second and third memory areas associated with a computer respective ranks, the first memory area having a highest rank and the third memory area having a lowest rank, each of the first, second and third memory areas being sized to store two or more file segments;

receiving, at the computer, a first file segment;

storing the first file segment in the first memory area;

reassigning, by the computer, a lower rank of the second memory area to the first memory area in response to:

accessing a second file segment, stored in another memory area, and determining that the first memory area is unable to store the second file segment due to being partially full such that an available capacity of the first memory area is less than a size of the second file segment;

assigning, by the computer, to the third memory area the highest rank previously had by the first memory area in response to said reassigning the lower rank of the second memory area to the first memory area that is partially full as no longer available to store additional file segments;

purging, by the computer, the third memory area in its entirety such that two or more file segments previously stored in the third memory area are deleted; and storing the second file segment in the third memory area currently having the highest rank, wherein after storing the second file segment, the third memory area has free space equal to at least a size of the second file segment.

17. The method of claim 16, wherein the first file segment comprises at least a portion of a live stream of video or recorded video.

18. The method of claim 16, wherein each of the first memory area, second memory area, and third memory area are respective subfolders on a disk.

* * * * *

UNITED STATES PATENT AND TRADEMARK OFFICE
CERTIFICATE OF CORRECTION

PATENT NO. : 8,782,143 B2  
APPLICATION NO. : 12/336706  
DATED : July 15, 2014  
INVENTOR(S) : Wesley McCullough Page 1 of 1

It is certified that error appears in the above-identified patent and that said Letters Patent is hereby corrected as shown below:

In the Claims

Column 9, Line 56, after "…partially full such", delete "than", insert -- that --, therefor.

Signed and Sealed this
Fourteenth Day of October, 2014

Michelle K. Lee
*Deputy Director of the United States Patent and Trademark Office*